US007423967B2

(12) United States Patent
Tzeng et al.

(10) Patent No.: US 7,423,967 B2
(45) Date of Patent: Sep. 9, 2008

(54) FAIRNESS SCHEME METHOD AND APPARATUS FOR PAUSE CAPABLE AND PAUSE INCAPABLE PORTS

(75) Inventors: Shrjie Tzeng, Fremont, CA (US); Yi-Hsien Hao, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1190 days.

(21) Appl. No.: 10/163,363

(22) Filed: Jun. 7, 2002

(65) Prior Publication Data

US 2003/0210651 A1 Nov. 13, 2003

Related U.S. Application Data

(60) Provisional application No. 60/378,651, filed on May 9, 2002.

(51) Int. Cl.
| | |
|---|---|
| *H04L 12/26* | (2006.01) |
| *H04J 3/14* | (2006.01) |
| *G08C 15/00* | (2006.01) |
| *G06F 11/00* | (2006.01) |
| *G01R 31/08* | (2006.01) |

(52) U.S. Cl. .................. 370/231; 370/235; 370/400; 370/475 H; 709/229

(58) Field of Classification Search ......... 370/229–235, 370/360–445, 476–528; 709/229–236
See application file for complete search history.

(56) References Cited

U.S. PATENT DOCUMENTS

| | | | | | |
|---|---|---|---|---|---|
| 5,699,520 | A | * | 12/1997 | Hodgson et al. ............. 709/234 |
| 6,026,075 | A | * | 2/2000 | Linville et al. .............. 370/236 |
| 6,118,761 | A | * | 9/2000 | Kalkunte et al. ............ 370/229 |
| 6,222,825 | B1 | * | 4/2001 | Mangin et al. .............. 370/235 |
| 6,226,685 | B1 | * | 5/2001 | Chen et al. .................. 709/238 |
| 6,252,849 | B1 | * | 6/2001 | Rom et al. ................... 370/230 |
| 6,359,885 | B1 | | 3/2002 | Kim et al. |
| 6,633,565 | B1 | * | 10/2003 | Bronstein et al. ........... 370/392 |
| 6,680,911 | B1 | * | 1/2004 | Kim ........................... 370/235 |
| 6,704,280 | B1 | * | 3/2004 | Mangin et al. .............. 370/230 |
| 6,762,995 | B1 | * | 7/2004 | Drummond-Murray et al. .. 370/229 |
| 6,801,500 | B1 | * | 10/2004 | Chandran .................. 370/230.1 |
| 6,816,489 | B1 | * | 11/2004 | Patra et al. .................. 370/390 |
| 6,850,542 | B2 | * | 2/2005 | Tzeng ......................... 370/475 |
| 6,918,005 | B1 | * | 7/2005 | Marchant et al. ............ 711/113 |
| 6,947,997 | B2 | * | 9/2005 | Tang et al. .................. 709/232 |
| 6,957,270 | B1 | * | 10/2005 | Erimli et al. ................ 709/235 |
| 6,978,323 | B1 | * | 12/2005 | Kimura et al. ............... 710/20 |
| 6,981,054 | B1 | * | 12/2005 | Krishna ...................... 709/235 |
| 7,002,911 | B1 | * | 2/2006 | Linville et al. .............. 370/230 |

(Continued)

*Primary Examiner*—M. Phan
(74) *Attorney, Agent, or Firm*—Squire, Sanders & Dempsey L.L.P.

(57) ABSTRACT

A network device, which includes a port, a tag generation unit and a flow control module, is provided. The port, which is connected to a network entity, is configured to send and receive a data packet. The tag generation unit is configured to generate a tag based upon the network entity. The tag generation unit is also configured to add the tag to the data packet and to activate the tag. The flow control module is coupled with a buffer, and is configured to control storage of the data packet into the buffer. The flow control module is also coupled with the port, and is configured to control a communication session conducted between the network device and the network entity based upon the tag.

41 Claims, 5 Drawing Sheets

U.S. PATENT DOCUMENTS

| | | | |
|---|---|---|---|
| 7,035,255 B2 * | 4/2006 | Tzeng | 370/389 |
| 7,035,286 B2 * | 4/2006 | Tzeng | 370/475 |
| 7,046,632 B2 * | 5/2006 | Chen et al. | 370/236 |
| 7,061,868 B1 * | 6/2006 | Ahlfors et al. | 370/236 |
| 7,092,387 B2 * | 8/2006 | Chen et al. | 370/360 |
| 2002/0172205 A1 * | 11/2002 | Tagore-Brage et al. | 370/395.42 |
| 2003/0026205 A1 * | 2/2003 | Mullendore et al. | 370/230 |
| 2003/0174649 A1 * | 9/2003 | Shankar et al. | 370/235 |
| 2003/0174650 A1 * | 9/2003 | Shankar et al. | 370/235 |
| 2003/0212814 A1 * | 11/2003 | Tzeng et al. | 709/235 |
| 2004/0179476 A1 * | 9/2004 | Kim et al. | 370/230 |

* cited by examiner

FAIRNESS SCHEME METHOD AND APPARATUS FOR PAUSE CAPABLE AND PAUSE INCAPABLE PORTS

REFERENCE TO RELATED APPLICATION

This application claims priority of U.S. Provisional Patent Application Ser. No. 60/378,651, which was filed on May 9, 2002. The subject matter of the earlier filed application is hereby incorporated by reference.

BACKGROUND OF THE INVENTION

1. Field of the Invention

This invention relates to systems and methods for providing a fairness scheme for managing and controlling the data flow of a network, which includes both a pause capable port and a pause incapable port.

2. Description of the Related Art

The media access control (MAC) protocol, as described in the IEEE 802.3 standard, provides the rules that define and determine how each device connected to the network accesses the cable to transmit data along various media, such as coaxial cable, twisted-pair cable, and fiber-optic medium. The MAC protocol may employ a variety of flow control techniques, such as the watermark (threshold) technique, to control data flow and mitigate the occurrence of congestion within a network device. For instance, during a data transmission session, if a destination device is not capable of processing the incoming data packets at the rate at which the packets are received, the destination device may temporarily store the incoming data packets in a buffer until the data packets can be processed. Therefore, the buffers of the destination device may begin to fill-up and become saturated with data packets. Once the buffer becomes saturated, the input and/or output ports of the destination device may become congested and start dropping data packets. Thus, a source device can overflow the incoming ports of the destination network device with too many data packets and still continue to send additional packets if the source device is unaware of the overflow (i.e., congestion) condition of the destination device. Packets dropped under such conditions may need to be retransmitted by the source device. However, if the destination device can send a pause signal to notify the source device about the overflow conditions and if the source device is device which is capable of slowing down or stopping its transmission in response to the pause signal until the destination network device can relieve the congestion; the number of data packets that the source network needs to retransmit may be reduced. Such a source device may be referred to as a pause capable device. However, when the network includes at least one network device, which is not capable of supporting or honoring a pause frame (i.e., a pause incapable device) the network may become locked into a communication session where either the pause incapable or pause capable device may be treated unfairly.

For example, in FIG. 1, network device 105 may be simultaneously engaged in a communication session with network device 115, which may be a pause incapable device, and network device 110, which may be a pause capable device. This scenario may create a two-to-one reception-to-transmission ratio where network device 105 receives twice as much incoming data as network device 105 is currently capable of transmitting out. Thus, the flow of the data packets must be monitored and controlled by the MAC (not shown) to prevention congestion from developing within network device 105. In one example, the data packets stored within the buffer (not shown) of network device 105 may reach a preset threshold. Consequently, network device 105 may begin to drop packets transmitted from the pause incapable device 115 and transmit a pause frame to the pause capable device 110. The network may 100 become locked into this communication session where network device 105 will only communicate with pause capable device 110, while network device 105 continues to drop the data packets received from pause incapable device 115.

Another unfair scenario may develop where pause capable network device 110 is treated unfairly. In such a scenario, the data packets stored within the buffers of network device 105 may reach a pause threshold triggering network device 105 to send a pause frame to pause capable device 110. However, network device 105 may not send out a pause frame to pause incapable device 115 because network device 105 knows that pause incapable device 115 will not honor the pause frame. Therefore, pause incapable device 115 will continue to send data packets to network device 105 during the congestion. A locked-communication session may develop where network device 105 will only communicate with pause incapable device 115 while pause capable device 110 remains in a pause state until the session between network devices 105 and 115 ends. Both of these scenarios are undesirable because they allow network 100 to become locked in an unfair communication session which provides preferential treatment to either the pause incapable or pause capable network device at the expense of the other device. Accordingly, new and improved systems and methods providing fair and impartial communication sessions for a network which includes pause capable and pause incapable devices are needed.

SUMMARY OF THE INVENTION

According to an embodiment of the invention, provided is a network device, which includes a port, a tag generation unit and a flow control module. The port, which is connected to a network entity, is configured to send and receive a data packet. The tag generation unit is configured to generate a tag based upon the network entity. The tag generation unit is also configured to add the tag to the data packet and to activate the tag. The flow control module is coupled with a buffer, and is configured to control storage of the data packet into the buffer. The flow control module is also coupled with the port, and is configured to control a communication session conducted between the network device and the network entity based upon the tag.

According to another embodiment of the invention, a network device is provided. The network device includes a first and second port, a tag generation unit and a flow control module. The first port, which connects to a pause capable device, is configured to send and receive a first data packet. The second port, which connects to a pause incapable device, is configured to send and receive a second data packet. The tag generation unit is configured to generate a first tag for the first data packet and to generate a second tag for the second data packet. The tag generation unit is also configured to add the first tag to the first data packet and to add the second tag to the second data packet. Furthermore, the tag generation unit is configured to activate the first tag and second tag. The flow control module is coupled with a buffer, and is configured to control storage of the first and second data packet into the buffer. The flow control module is also coupled with the first and second port, and is configured to control a first communication session conducted between the network device and the pause capable device based upon the first tag and to control a second communication session conducted between the network device and the pause incapable device based upon the second tag.

An embodiment of the invention, provided is a method of flow control. The method includes providing a port in the network device, wherein the port is connected to a network entity, receiving a data packet at the port, generating a tag based upon the network entity, adding the tag to the data packet, and regulating the storage of the packet in a buffer based upon the tag.

Another embodiment of the invention provides a network device, which includes a flow control means for negotiating a first communication session between a pause capable device and the network device and a second communication session between a pause incapable device and the network device.

Another embodiment of the invention provides a network device, which includes a flow control means for unlocking a first communication loop developed between a pause capable device and the network device and a second communication loop developed between a pause incapable device and the network device.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The invention provides a fairness scheme to assist a network device to manage and control the flow of data packets transmitted from pause incapable and pause capable devices. In other words, during the transmission and reception of data packets to and from a network device, the invention provides a scheme which regulates how to handle these data packets in an efficient and fair manner while simultaneously mitigating the occurrence of congestion.

For the purposes of the following discussion, the terms packet, data packet, traffic, and frame may be used interchangeably. According to a preferred embodiment of the invention, the network device may be an Ethernet switch, and accordingly, a packet may refer to an Ethernet frame as defined by IEEE 802.x and as modified herein. ATM (Asynchronous Transfer Mode) and other fixed cell length systems, as well as, other devices and packets may also be within the scope of the invention.

Figure 1:
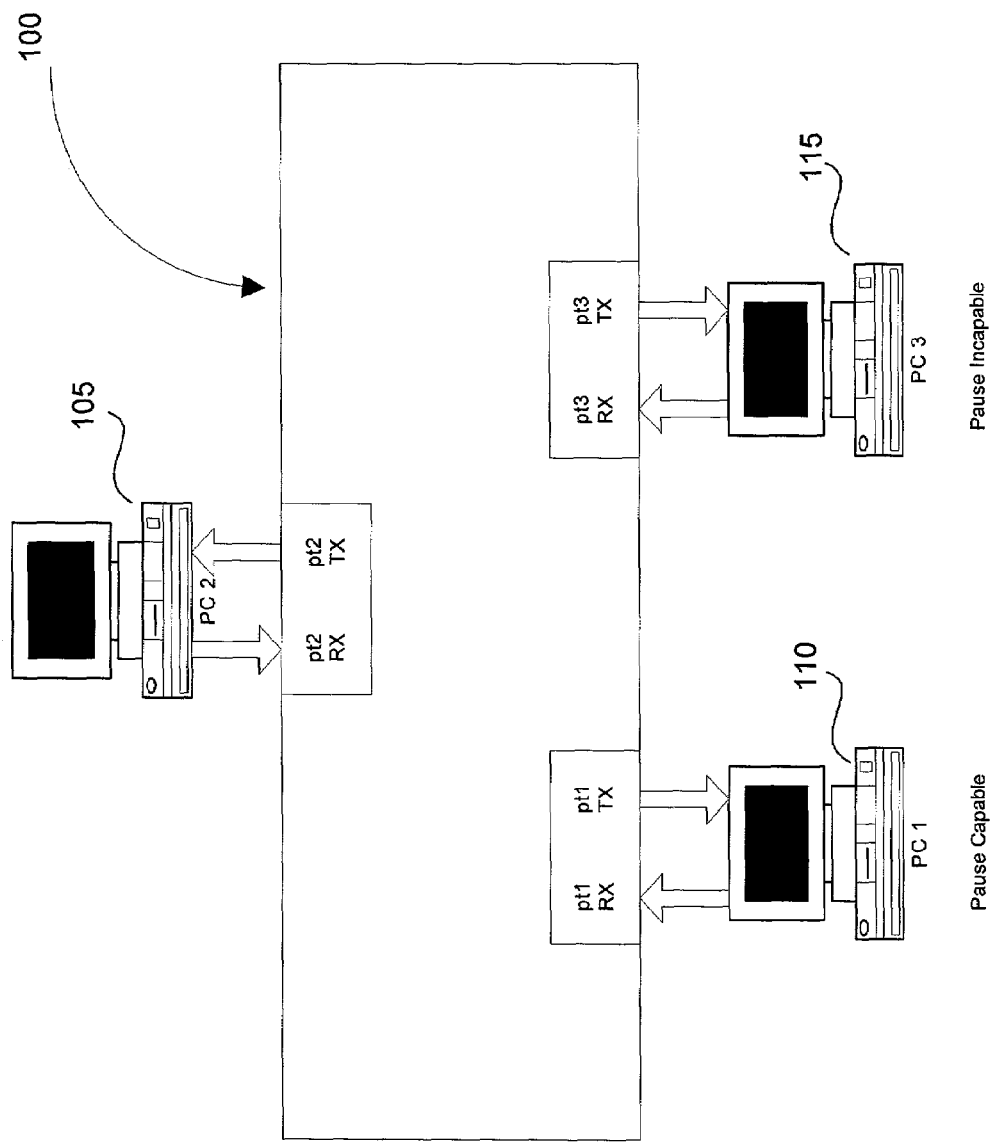
FIG. 1 is a block diagram of a network including a pause incapable and a pause capable network device.
Figure 2:
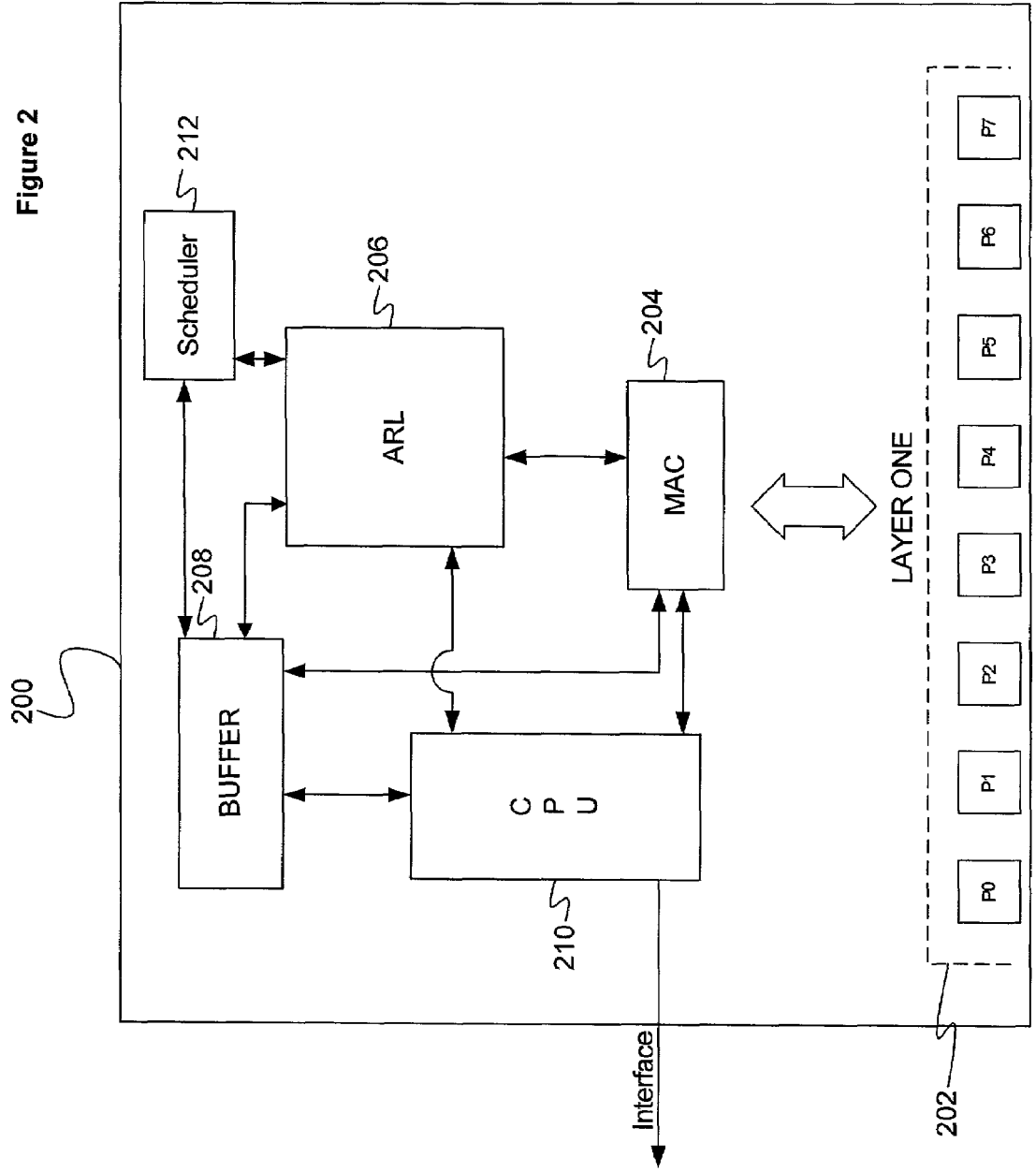
FIG. 2 is a block diagram of a network device according to an embodiment of the invention.

FIG. 2 is a block diagram of an exemplary network device according to an embodiment of the invention. Device 200 may be a packet forwarding unit, but is not limited to, such as a switch and may be used within a network to control the flow of data to a customer or subscriber of the network. For instance, network device 200 may be a switch, hub, repeater, or any other network device, which may be configurable to perform the network functions defined herein. Device 200 may utilize and connect to a local area network (LAN), Wide Area network (WAN), or other networks such as the Internet and World Wide Web. Device 200 may include a number of network ports 202 (e.g., P0-P7), which may be well known as PHYs or transceivers and perform Ethernet layer one functions. Network ports 202 are connected to network devices on one end, such as a pause capable or pause incapable subscriber (not shown), and to media access controller (MAC) 204 internally via an interface layer (not shown). MAC 204 represents an Ethernet layer-two block which interfaces the layer one device with the upper layers blocks of the device. MAC 204 may perform standard layer two functions in addition to those described herein.

Device 200 may also include or be connected to a CPU 210 which may perform certain network functions, and which may communicate with, configure, and control other systems and subsystems of device 200. Device 200 may include buffer 208, which may be any number of registers, SRAM, DRAM or other memory as necessary to perform networking functions. Also, device 200 may include Address Resolution Logic (ARL) 206 for performing networking functions, such as rate control, fast filter processing (FFP), congestion control, routing, learning, etc. Accordingly, ARL 206 is connected to and may communicate with MAC 204, CPU 210 and buffer 208. ARL 206 may also be configured to pre-read or snoop network ports 202 in order to perform or support a service differentiation scheme according to the invention. Device 200 may include a scheduler 212, which may be part of buffer or memory pool 208 or ARL 206, or may be a separate subsystem. Scheduler 212 is configured to schedule or queue data packets buffered in buffer 208. According to the invention, scheduler 212 is configured to identify each packet, by its header, receiving port, identification tag, VLAN tag, etc., and schedule data packets for transmission at each port based upon the priority of the data packet, the bandwidth allotted to the destination port, the order in which the packet was received, and/or the type of data packet.

Device 200 also may include a number of interfaces for directly controlling the device. These interfaces may provide for remote access (e.g., via a network) or local access (e.g., via a panel or keyboard). Accordingly, device 200 may include external interface ports, such as a USB or serial port, for connecting to external devices, or CPU 210 may be communicated with via network ports 202. In this example, interfaces are shown connected to device 200 via the CPU 210.

One having ordinary skill in the art will readily understand that many types of network devices may be used to implement the invention. It should be noted that the invention is not meant to be limited to device described herein. One having ordinary skill in the art will readily understand that the invention is applicable to many other packet forwarding devices and device configurations.

During a communication session where network device 200 receives data packets simultaneously from a pause capable and pause incapable device (not shown), device 200 may not be able to process the packets at the same rate at which the packets are received at the input ports. Thus, the network device may store the packets in buffer 208 until the packets can be further processed. As discussed above, the influx of data packets into network device 200 at a two-to-one ratio may cause buffer 208 to approach its threshold. As the buffer fills, a method of flow control may be implemented to prevent congestion. Namely, the buffer's manager must decide from which port or queue to drop the incoming data packets or to which pause capable device to send a pause frame in order to prevent the buffer from exceeding its storage area.

The determination of when to drop a packet or to send a pause frame may be made using a watermark method, which is based on the size of packets and the size of the buffer. Generally, buffer 208 may have a high watermark and a low watermark. Associated with these watermarks may be certain PAUSE times, during which the congestion is expected to ease. Upon the data packets stored in the buffer exceeding the low-watermark, device 200 may generate a flow control frame with a PAUSE time. The PAUSE frame may be sent from device 200 to one or more pause capable devices, which will then stop sending new packets for a time period specified by the PAUSE frame. However, any data packets, which have already been forwarded to device 200 before the PAUSE frame is transmitted, will be accepted, since time is needed for the PAUSE frame to travel from device 200 to the pause capable device and the pause capable device will need time to process and respond to the PAUSE frame. Thus, accepting the already transmitted data packets enables device 200 to continue to maintain a smooth data flow control process. After the PAUSE time has elapsed and if the congestion has been relieved, the pause capable device may resume sending packets again to device 200. If the congestion is not relieved, the packets in buffer 208 may reach the high watermark. When the threshold reaches the high watermark, if the congestion does not ease during the PAUSE time, device 200 may begin to drop packets received from the pause capable device, pause incapable device or both. Network device 200 may include another watermark, PAUSE off, (hysteristic threshold). The PAUSE off frame may have a pause time equal to zero which instructs the pause capable device to resume transmitting data packets once again to network device 200.

However, if conventional techniques are employed to carry out the packet dropping decision and pause frame signals, the network may become locked in an unfair communication scheme, as described above. Therefore, in order to manage the data flow equitably, a method of applying a fairness scheme may be implemented according to the invention.

Figure 3:
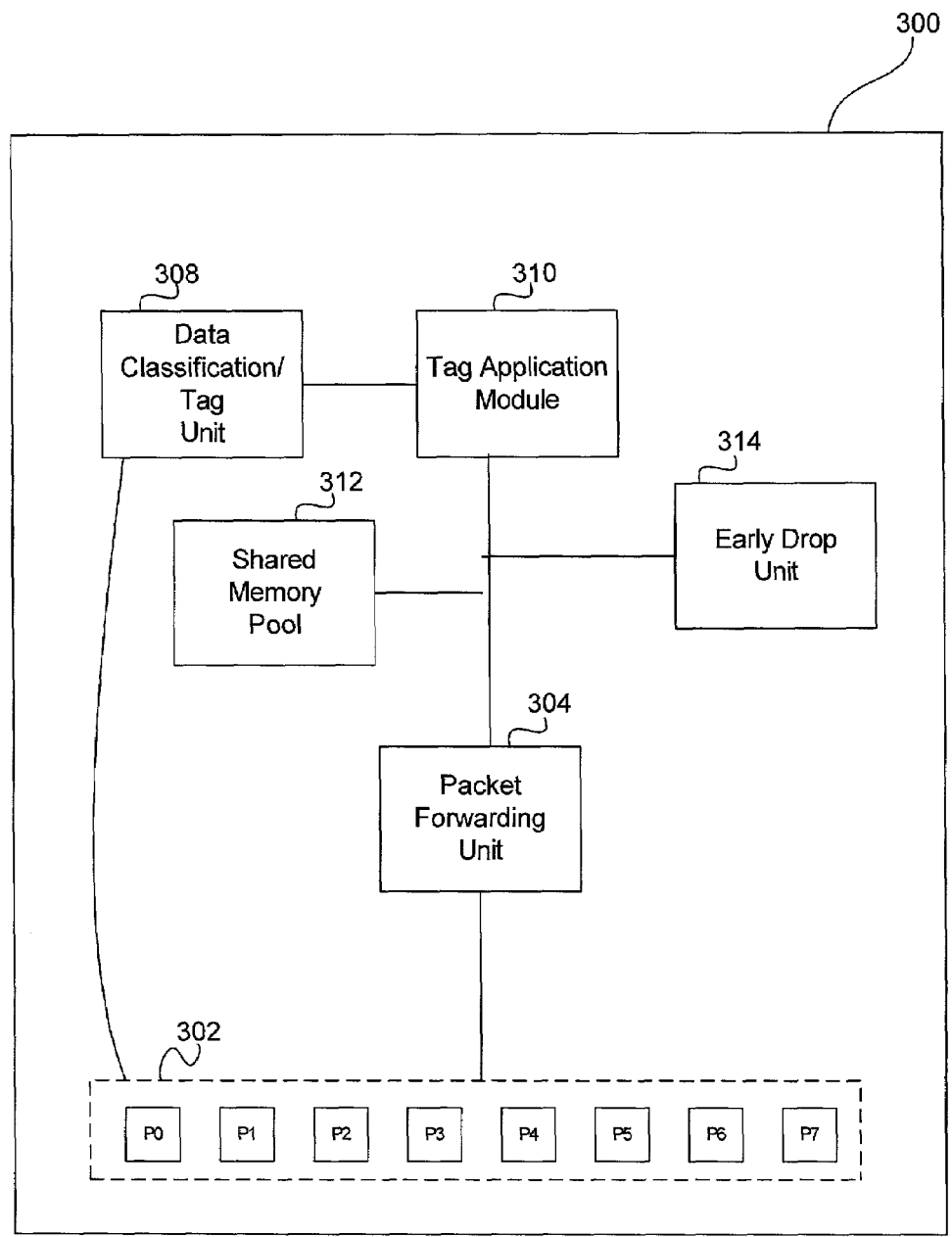
FIG. 3 is a block diagram of a network device which may support a fairness scheme according to an embodiment of the invention.

FIG. 3 is a block diagram of an example network device according to an embodiment of the invention. Network device 300 may be a switch, hub, repeater, or any other network device which may be configurable to perform the network functions defined herein. Device 300 includes a plurality of network ports 302 which are configured to send and receive signals to other network devices over a network. Accordingly, port 302 may be well-known PHYs or transceivers. Device 300 may also include a packet forwarding unit 304, a data classification/tag unit 308, a tag application module 310, a shared memory pool (buffer) 312, and an early drop unit 314. Packet forwarding unit 304 is connected to ports 302 and is configured to perform various switching functions in relation to signals received at port 302. For example, if device 300 is a network switch, packet forwarding unit 304 may contain the necessary hardware and software in order to switch data packets from one port of ports 302 to another port. If on the other hand, network device 300 is a repeater, packet forwarding unit 304 contains the necessary hardware and software in order to repeat a signal received at one port of ports 302 to all the ports 302.

Data classification/tag unit 308 is coupled with ports 302 and with tag application module 310, and is configured to "snoop" data packets being received at any of ports 302. Data classification/tag unit 308 is also configured to classify the type of data being received at each port and to transmit this classification to tag application module 310. The data classification/tag unit 308 generates and adds label information to the data packets that provide device 300 with additional information as to how to handle the data packet accordingly. The data classification/tag unit 308 may utilize the receiving port to initially identify whether the source of the data packet is either a pause capable or pause incapable network device. The data classification/tag unit 308 may use this information to create a pause capable or pause incapable identification tag, which is added to the data packet only when congestion arises within the network device. Alternatively, device 300 may be configured to add a tag to all incoming data packets.

The identification tag may be inserted into the header of the packet, for example, between the source address field and the type/length field. Generation of the identification can be carried out according to the following example. The identification tag can be divided into two components, ID TYPE and ID TAG. The ID TYPE indicates that the data packet is either pause capable or pause incapable. Activation of the ID TAG instructs the network that congestion exists within the network device and that the identification tag should be used when making a flow control decision. To enable the identification tag, a bit of the ID TAG can be set to value "1." Data classification/tag 308 is also capable of unsetting the identification tag when the congestion is relieved. Thus, the bit of the ID TAG can be set to value "0" to unset the ID tag.

The invention may also be configured to classify packets based on several different criteria, including the pause capable/incapable identification tag. For example, the invention may be configured to also classify and switch packets based on the Type-of-service (ToS) field of the IP header. A network operator may define a plurality of classes of service using the bits in the ToS field in the IP header or priority bits in the Ethernet header. Data classification/tag unit 308 may also utilize other Quality-of-service (QoS) features to assign appropriate traffic-handling policies, including congestion management, bandwidth allocation, and delay bounds for each traffic class.

In response to the classification of and assignment of the identification tag to any data packets received, tag application module 310 is configured to determine the appropriate action which should be applied to the data packet should a flow control problem arise. The tag application module 310 may use one or more of the classification schemes, as discussed above, to determine how the packet should be treated by network device 300. Accordingly, the tag application module 310 may be configured to include or communicate with a look-up table (not shown) in order to use the classification data as an identification tag to search the look-up table to determine the appropriate flow control treatment for each pause capable or pause incapable data packet.

As rate control is applied, and congestion occurs, data packets are buffered in the shared memory pool 312 and queued. As the buffer fills, the early drop unit 314 is configured to drop data packets. Accordingly, the early drop unit 314 (or schedulers, which are not shown) is configured to determine whether to drop the data packets based upon the information determined by the data classification/tag unit 308 and tag application module 314. The early drop unit 314 may decide from which input ports or output ports to drop data packets. Data classification/tag unit 308, tag application module 310 and early drop unit 314 may individually or collectively each perform the function of serving as a fairness scheme to regulate the storage of the data packets in memory pool 312 based upon the classification of the data packets.

In determining which packets to drop, tag application module 310 and early drop unit 314 may rely upon one or more factors to differentiate between the types of services to be applied to the incoming packets. To differentiate the incoming packets, the tag application module 310 may use the ID TYPE and ID TAG of the identification tag assigned to the packets by the data classification/tag unit 308. The tag application module can also determine whether the ID TAG has been set or unset by the data classification/tag unit 308. The tag application module 310 may be configured to interpret an activated pause capable identification tag to denote means that congestion exits and that device 300 should send a pause frame out to the corresponding pause capable device 320. When the congestion problem has dissipated, the data classification/tag unit 308 may unset the identification tag so that tag application module 310 instructs device 300 to send a pause frame having a pause timer equal to zero to pause capable device 320. Thus, the pause off frame signal reestablishes the communication session between network drive 300 and the pause capable device 320.

The assignment of an activated pause incapable identification tag to a data packet by the data classification/tag unit 308 may instruct device 300 to drop the pause incapable data packet during congestion. The data classification/tag unit 308 may likewise unset the identification tag within the pause capable data packet when the congestion has been relieved. Thus, tag application module 310 may instruct network device 300 to stop dropping the pause incapable data packets when the network device is no longer congested.

Using this internal tag identification scheme, when congestion develops within the device, network device 300 may regulate the data flow by issuing a pause frame to pause capable device 320 and by dropping the data packets received from pause incapable device 325 until the congestion decreases. Network device 300 may issue a pause frame to one or more pause capable devices. Network device 300 may also drop the data packets received at one or more ports associated with one or more pause incapable devices.

However, when the data packets stored within the buffer 312 drops below a predetermined threshold indicating that the congestion has been relieved, the invention provides a fairness scheme which is capable of re-establishing the network device's communication session with both the pause capable and the pause incapable devices. In other words, the invention unsets the identification tags, as discussed above, within the pause capable data packets to instruct network device 300 to issue a PAUSE off frame to the respective pause capable devices. Thus, instructing the pause capable device 320 to begin retransmitting data packets to network device 300. Likewise, the invention may unset the identification tags within the pause incapable data packets when the congestion has decreased so that network device 300 will stop dropping data packets from the respective pause incapable devices 325 and begin to accept incoming data packets transmitted from pause incapable device 325.

Figure 5A:
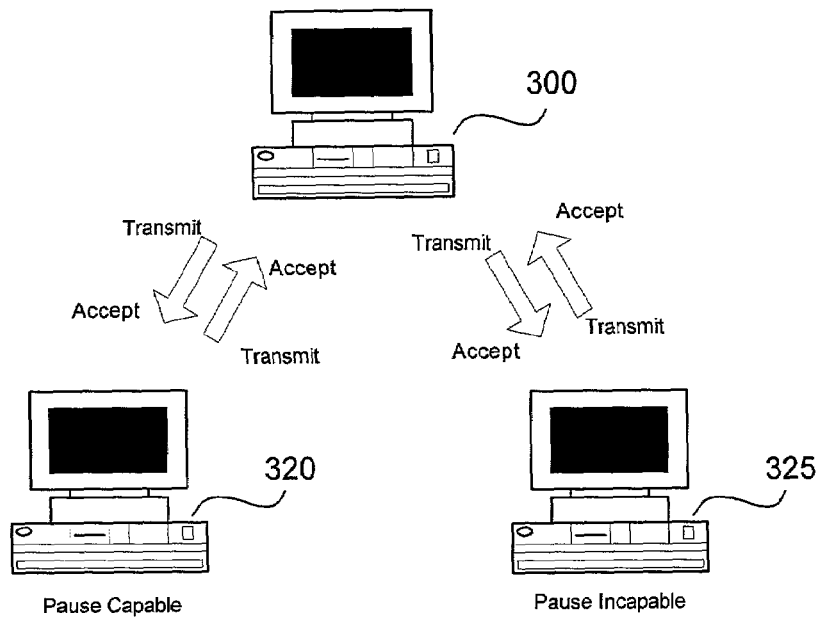
FIG. 5 illustrates a network conducting communications session according to an embodiment of the invention.
Figure 5B:
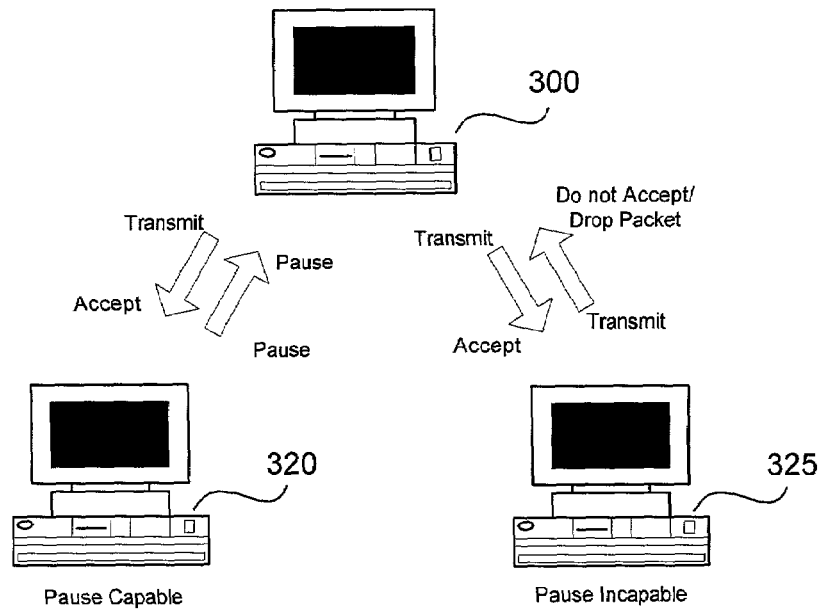

In general, for a data transfer between two network devices to be successful, one device must transmit data to a second device, and the second device must receive and accept the transmitted data as shown in FIG. 5A. According to the invention, when congestion does not exist in network device 300, the communication session between the network device 300 and the pause incapable device will be a packet acceptance communication session (FIG. 5A), where the network device 300 will accept the incoming data packets transmitted from pause incapable device 325. However, as shown in FIG. 5B, the setting (activation) and unsetting (deactivation) of the identification tags may control the communication session between network device 300 and pause incapable device 325. Although activation of the identification tag may not prevent pause incapable device 325 from transmitting additional data packets to the network device 300, activation of the identification tag may modify the communication session so that network device 300 will begin dropping the data packets received from pause incapable device 325. Namely, activation of the identification tag terminates the packet acceptance communication session between network device 300 and pause incapable device 325, but may not terminate the packet transmission session from pause incapable device 325 to network device 300. When the congestion has been relieved, the identification tag will be unset (deactivated). Deactivation of the identification tag re-establishes the packet acceptance communication session so that network device 300 will begin to accept the data packets transmitted from the pause incapable device 325 as shown in FIG. 5A.

Figure 4:
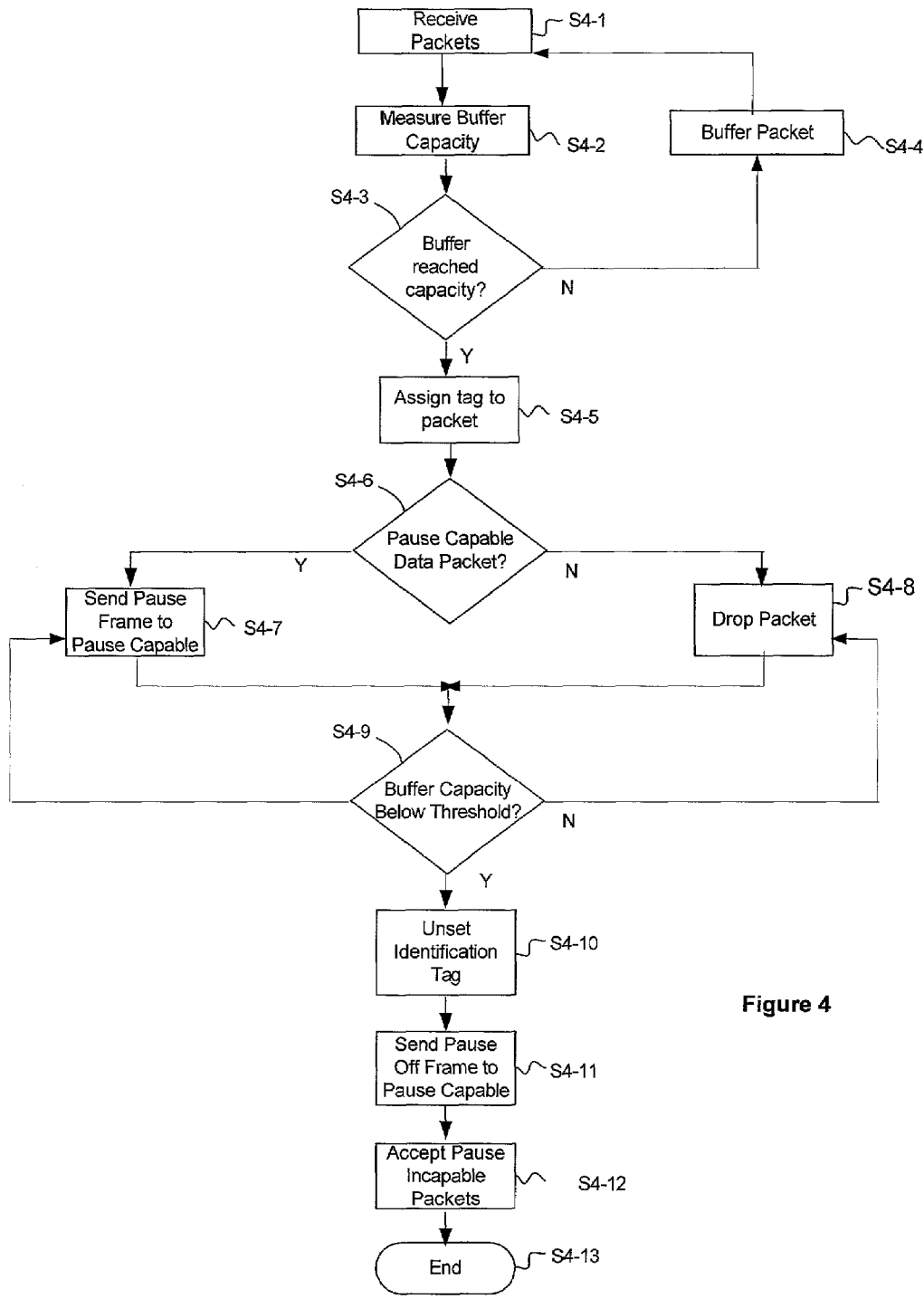
FIG. 4 is a flowchart of a method for providing a fairness scheme to handle a network which includes both pause capable and pause incapable devices.

FIG. 4 is a flow chart of a method for applying the flow control scheme according to an embodiment of the invention. At step S4-1, a packet is received at a device performing data flow control, such as a network switch described above. The packet may be destined for a subscriber of the network or of an Internet Service Provider (ISP), for example, and data control may be applied to control the traffic to that subscriber. As described above, data control may be applied a number of ways, such as by the watermark (threshold) method.

Next, at step S4-2, the capacity of the buffer, which may be a shared buffer or an individual buffer associated with a respective port, is checked. This can be accomplished by employing watermark technology or another buffer-capacity detection scheme. If, at step S4-3, the capacity of the buffer has not reached a predetermined threshold, the packet is stored in a buffer at step S4-4. As described above, the device may include a scheduler, which is coupled to the buffer and configured to schedule the data packets stored for transmission.

If a predetermined level at step S4-3, based upon the size of the buffer, the size of the data packet, etc., is reached, then at step S4-5, information may be determined about the data packet. For example, as already described above, the port of a switch or other network device may be snooped by a data classification/tag unit of the switch, the header of the packet may be read to determine the classification of the packet. Based upon, for example, the port at which the data packet is received, the data classification/tag unit may assign and set an identification tag indicating whether the data packet is a pause capable or pause incapable data packet.

Next, at step S4-6, the identification tag of the packet is checked to determine how the network device should handle the packet. A tag application module may check to determine whether the packet is a pause capable or a pause incapable packet. If the data packet is a pause capable packet, at step S4-7, the tag application module may instruct the network device to issue a PAUSE frame to one or more pause capable devices.

If at step S4-6, the packet is not a pause capable packet, an early drop unit at step S4-8 may instruct the network device to begin dropping data packets received from one or more pause incapable devices. At step S4-9, the buffer is checked again to determine whether the congestion within the network device has been relieved. This can be performed by checking to determine if the capacity of the data packets stored in the buffer has fallen below a predetermined level. If the capacity has not fallen below the threshold in step S4-9, the network device will return to steps S4-7 and S4-8 and continue to send out pause frames to the pause capable if the previous pause time has expired and continue to drop the data packets received from the pause incapable ports, respectively.

If the buffer's capacity has fallen below the threshold set in step S4-9, next at step S4-10, the data classification/tag unit may unset the identification tag of the data packet. Thus, at step S4-11, the network device may re-establish a communication session with the pause capable device by transmitting a PAUSE off frame instructing the pause capable device to begin retransmitting data packets to the network device. At step S4-12, a packet acceptance communication session may be re-established between the network device and the pause incapable by instructing the network device to begin permitting entry of the data packets transmitted from the pause incapable device into the network device. At step S4-13, processing of the packet ends.

One having ordinary skill in the art will understand that the steps of the method may be performed in a different order, or with multiple steps in parallel with one another. Also, one having ordinary skill in the art will understand that a network device may be configured to perform the above-described method either in silicon or in software. Accordingly, one will understand that the switching configurations described herein are merely exemplary. Although the invention has been described based upon these preferred embodiments, it would be apparent to those of skilled in the art that certain modifications, variations, and alternative constructions would be apparent, while remaining within the spirit and scope of the invention. For example, any network device may implement the configuration of the invention. In order to determine the metes and bounds of the invention, therefore, reference should be made to the appended claims.

We claim:

1. A network device comprising:
   a port configured to send and receive a data packet, wherein the port is connected to a network entity;
   a tag generation unit configured to generate a tag based upon the network entity, said tag generation unit being configured to add the tag to the data packet and to activate the tag; and
   a flow control module coupled with a buffer and configured to control storage of the data packet into said buffer, wherein said flow control module is coupled with the port and is configured to control a communication session conducted between the network device and the network entity based upon the tag.

2. The network device as recited in claim 1, wherein said network entity comprises a pause capable device.

3. The network device as recited in claim 1, wherein said network entity comprises a pause incapable device.

4. The network device as recited in claim 2, wherein said tag generation unit is configured to activate the tag to instruct the flow control module to send a pause frame signal to said network entity.

5. The network device as recited in claim 2, wherein said tag generation unit is configured to deactivate the tag to instruct the flow control module to send a pause off frame signal to said network entity.

6. The network device as recited in claim 2, wherein said buffer includes a watermark unit to determine a current buffer capacity of said buffer; and
   wherein said watermark unit is configured to send a pause frame signal to said network entity when said buffer capacity reaches a first level and to send a pause off frame signal to said network entity when said buffer capacity reaches a second level.

7. The network device as recited in claim 2, wherein said tag generation unit is configured to activate the tag to pause the communication session between the network device and the network entity.

8. The network device as recited in claim 2, wherein said tag generation unit is configured to deactivate the tag to initiate the communication session between the network device and the network entity.

9. The network device as recited in claim 3, wherein the tag generation unit is configured to activate the tag to instruct the flow control module to drop said data packet.

10. The network device as recited in claim 3, wherein said tag generation unit is configured to deactivate the tag to instruct the flow control module to add the packet to said buffer.

11. The network device as recited in claim 3, wherein said buffer includes a watermark unit to determine a current buffer capacity of said buffer; and
    wherein said watermark unit is configured to instruct said flow control module to drop said data packet when said buffer capacity reaches a first level and to instruct said flow control module to add the data packet to said buffer when said buffer capacity reaches a second level.

12. The network device as recited in claim 3, wherein said tag generation unit is configured to activate the tag to terminate a packet acceptance communication session between the network device and the network entity.

13. The network device as recited in claim 3, wherein said tag generation unit is configured to deactivate the tag to initiate a packet acceptance communication session between the network device and the network entity.

14. A network device comprising:
    a first port configured to send and receive a first data packet, wherein the first port is connected to a pause capable device;
    a second port configured to send and receive a second data packet, wherein the second port is connected to a pause incapable device;
    a tag generation unit configured to generate a first tag for the first data packet and to generate a second tag for the second data packet, said tag generation unit being configured to add the first tag to the first data packet and add the second tag to the second data packet, said tag generation unit being configured to activate the first tag and second tag; and
    a flow control module coupled with a buffer and configured to control storage of the first and second data packet into said buffer, said flow control module is coupled with the first and second port and is configured to control a first communication session conducted between the network device and the pause capable device based upon the first tag and to control a second communication session conducted between the network device and the pause incapable device based upon the second tag.

15. The network device as recited in claim 14, wherein said tag generation unit is configured to activate the tag to instruct the flow control module to send a pause frame signal to said pause capable device.

16. The network device as recited in claim 14, wherein said tag generation unit is configured to deactivate the tag to instruct the flow control module to send a pause off frame signal to said pause capable device.

17. The network device as recited in claim 14, wherein said buffer includes a watermark unit to determine a current buffer capacity of said buffer; and
    wherein said watermark unit is configured to send a pause frame signal to said pause capable device when said buffer capacity reaches a first level and to send a pause off frame signal to said pause capable device when said buffer capacity reaches a second level.

18. The network device as recited in claim 14, wherein said tag generation unit is configured to activate the tag to pause the communication session between the network device and the pause capable device.

19. The network device as recited in claim 14, wherein said tag generation unit is configured to deactivate the tag to initiate the communication session between the network device and the pause capable device.

20. The network device as recited in claim 14, wherein the tag generation unit is configured to activate the tag to instruct the flow control module to drop said second data packet received from said pause incapable device.

21. The network device as recited in claim 14, wherein said tag generation unit is configured to deactivate the tag to instruct the flow control module to add said second data packet received from said pause incapable device to said buffer.

22. The network device as recited in claim 14, wherein said buffer includes a watermark unit to determine a current buffer capacity of said buffer; and
wherein said watermark unit is configured to instruct said flow control module to drop said second data packet received from said pause incapable device when said buffer capacity reaches a first level and to instruct said flow control module to add said second data packet received from said pause incapable device to said buffer when said buffer capacity reaches a second level.

23. A method of flow control in a network device, said method comprising:
providing a port in the network device, wherein the port is connected to a network entity;
receiving a data packet at said port;
generating a tag based upon the network entity;
adding the tag to said data packet; and
regulating the storage of said packet in a buffer based upon the tag.

24. The method as recited in claim 23, further comprising the step of:
determining the capacity level of said buffer; and
regulating a communication session between said network device and said network entity when said capacity reaches a predetermined level.

25. The method as recited in claim 24, wherein said network entity comprises a pause capable device.

26. The method as recited in claim 24, wherein said network entity comprises a pause incapable device.

27. The method as recited in claim 25, further comprising the steps of:
determining a current buffer capacity of said buffer;
sending a pause frame signal to said network entity when said buffer capacity reaches a first level; and
sending a pause-off frame signal to said network entity when said buffer capacity reaches a second level.

28. The method as recited in claim 26, further comprising the steps of:
determining a current buffer capacity of said buffer;
dropping said data packet when said buffer capacity reaches a first level; and
storing said data packet in said buffer when said buffer capacity reaches a second level.

29. A method of flow control in a network device, said method comprising:
providing a flow control scheme to negotiate a first communication session between a pause capable device and the network device and a second communication session between a pause incapable device and the network device in an impartial manner.

30. The method as recited in claim 29, further comprising the steps of:
controlling the second communication session to unlocking a communication loop developed between the pause capable device and the network device.

31. The method as recited in claim 29, further comprising the steps of:
controlling the first communication session to unlocking a communication loop developed between the pause incapable device and the network device.

32. A network device comprising:
a port configured to send and receive a data packet, wherein the port is connected to a network entity;
a tag generation means for generating a tag based upon the network entity, said tag generation means is configured to add the tag to the data packet and to activate the tag; and
a flow control means for controlling storage of the data packet into a buffer, wherein said flow control means is configured to control a communication session conducted between the network device and the network entity based upon the tag.

33. The network device as recited in claim 32, wherein said network entity comprises a pause capable device.

34. The network device as recited in claim 32, wherein the network entity comprises a pause incapable device.

35. The network device as recited in claim 34, wherein said flow control means is configured to determine a current buffer capacity of the buffer, said flow control means is configured to drop said packet when said buffer capacity reaches a first level and is configured to store said packet when said buffer capacity reaches a second level.

36. The network device as recited in claim 33, wherein said flow control means is configured to determine a current buffer capacity of the buffer, said flow control means is configured to send a pause frame signal to the network entity when said buffer capacity reaches a first level and is configured to send a pause off frame signal when said buffer reaches a second level.

37. A network device comprising:
a flow control means for negotiating a first communication session between a pause capable device and the network device and a second communication session between a pause incapable device and the network device.

38. A network device comprising:
a flow control means for unlocking a first communication loop developed between a pause capable device and the network device and a second communication loop developed between a pause incapable device and the network device.

39. The network device as recited in claim 1, wherein the network device comprises a switch.

40. The network device as recited in claim 1, wherein the network device comprises a router.

41. The network device as recited in claim 1, wherein the network device comprises a hub.

* * * * *